3,185,627
SILICONE COMPOSITION
Gus S. Kass, Chicago, Ill., assignor, by mesne assignments, to Hazel Bishop Inc., Newark, N.J., a corporation of New York
No Drawing. Filed Sept. 3, 1954, Ser. No. 454,222
13 Claims. (Cl. 167—90)

This invention relates to silicone compositions, and more particularly, to improved silicone compositions comprising a solvent additive that is capable of dissolving silicones and also improving the compatibility of silicones with still other materials.

Organo-silicone polymers (i.e. polysiloxanes) form a well known class of compounds which are often referred to as "silicones." These polysiloxanes have the general formula:

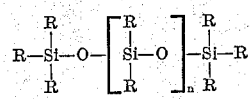

wherein R is ordinarily a monovalent organic radical usually connected directly to the Si with a C atom. In resin-forming polysiloxanes some of the R's are hydrolyzable and permit the formation of Si—O—Si cross links upon heating usually in the presence of catalysts; but in the organo-silicon "fluids" or oils substantially all of the R's are non-hydrolyzable and the fluid is heat stable. In such cases, the R may be attached to a Si atom through an O linkage if the R is of sufficient molecular weight or chain length to form a non-hydrolyzable oxy group. Most preferably, R is a hydrocarbon radical such as methyl, ethyl, propyl, benzyl or phenyl having 1 to 8 carbon atoms; but R may be a $C_1$–$C_{18}$ radical including aliphatic, mixed aliphatic-aromatic, or heterocyclic groups, such as methyl, ethyl, propyl, isopropyl, butyl, amyl, hexo, cetyl to octadecyl and higher, cyclopentyl, cyclohexyl, phenyl, tolyl, xylyl, mesityl, monoethylphenyl, diethylphenyl, naphthyl, methylnaphthyl, benzyl, phenylethyl, furfuryl and the like. Using aliphatic or mixed aliphatic-aromatic groups, the aliphatic group may be branched or straight chained, it may be substituted or unsubstituted, and it may be saturated or unsaturated, such as allyl, methallyl, vinyl, or acrylic groups. These compounds are well known in the art and it is known that they possess a number of very valuable properties permitting their use in a number of different ways. One of the greater difficulties involved in the use of polysiloxanes, however, is the difficulty of making solutions of these materials and/or making solutions of these materials with a solvent and certain other additives which are often used. For example, the polysiloxanes possess certain properties which make their use in cosmetics and the like compositions interesting, but these polysiloxanes are incompatible with practically all ingredients ordinarily used in cosmetics, suc has mineral oil, lanolin, petrolatum, etc. This invention provides a solvent which has unique solvent properties with respect to the instant polysiloxanes and also is compatible with a number of other ingredients, including those commonly used in cosmetics and the like compositions, so that the instant solvent is capable of use in the formation of compositions containing polysiloxanes and the usual cosmetic ingredients, whereby compatibility is obtained.

It is, therefore, an important object of the instant invention to provide a new and improved polysiloxane composition containing an improved solvent for polysiloxanes which is also compatible with a number of ingredients which may be used with polysiloxanes.

Another object of the instant invention is to provide an improved composition comprising a $C_1$–$C_3$ alkyl $C_8$–$C_{14}$ alkanoate and an organo-silicon polymer dissolved therein.

Still another object of the instant invention is to provide an improved composition comprising a $C_1$–$C_3$ alkyl $C_8$–$C_{14}$ alkanoate, an organo-silicon polymer, and cosmetic-type ingredients from the group consisting of mineral oil, petrolatum, lanolin, $C_8$–$C_{20}$ fatty acid or glycerides thereof and $C_8$–$C_{20}$ fatty alcohol.

Other objects, features and advantages of the present invention will become apparent to those skilled in the art from the following detailed disclosure of preferred embodiments thereof.

In its broadest aspects, the invention consists in a composition comprising, as miscible ingredients, a $C_1$–$C_3$ alkyl $C_8$–$C_{14}$ alkanoate and an organo-silicon polymer; and in more specific aspects of the instant invention, the composition also contains mineral oil, petrolatum, lanolin, $C_8$–$C_{20}$ fatty acid and/or $C_8$–$C_{20}$ fatty alcohol.

A key to the instant invention resides in the discovery of the unique solvent powers possessed by the $C_1$–$C_3$ alkyl $C_8$–$C_{14}$ alkanoates, with respect to the polysiloxanes or organo-silicon polymers. These alkanoate esters in methyl, ethyl, propyl and isopropyl esters of octanoic (caprylic, nonanoic (pelargonic), decanoic (capric), hendecanoic (undecylic), dodecanoic (lauric), tridecanoic (tridecylic), tetradecanoic (myristic) acids. Preferably they are isopropyl esters of the usual vegetable fatty acids: caprylic, capric, lauric and myristic. Those preferred for minimum odor are the $C_{12}$–$C_{14}$ alkanoates; and best all around performance is exhibited by isopropyl myristate. It will be understood that commercial grades of these esters may be used herein; and these esters are ordinarily derived from a "natural" source of the acid, such as coconut or palm kernel oil so that commercial grades of, for example, isopropyl myristate may contain 70 to 90 weight percent thereof with the remainder caprate, laurate, palmitate, etc. In the practice of the invention, commercial grades of a given allkyl alkanoate used should contain at least 70 weight percent of the alkyl alkanoate specified (with the remainder related alkyl-alkanoates of the same general class). As used herein, the terms "parts" and "percent" means parts and percent by weight, unless otherwise specified.

A particularly strange feature of the instant invention resides in the fact that such ingredients as butyl myristate, butyl stearate, propylene glycol myristate, propylene glycol laurate, and isopropyl palmitate are non-solvents, in C.P. form and in commercial (70% specified ingredient) grades. A commercial grade isopropyl palmitate appears to possess solvent properties using extremely low viscosity polysiloxanes (e.g. not more than 100 centistokes), but even then it can effectively dissolve only about 10% thereof of the polysiloxane (and this may be due primarily to myristate impurities therein).

Silicon or polysiloxane fluids or oils are available commercially in viscosities ranging from about 40 to about 100,000; and isopropyl myristate is completely miscible therewith throughout the entire viscosity range. The following Table 1 shows results obtained using "GE SF-96 Silicon Oils" (which are dimethylpolysiloxane oils) of different viscosities (centistokes at 25° C.) with isopropyl myristate (IPM) commercial grade.

TABLE 1

*Miscibility of isopropyl myristate and General Electric SF-96 Silicon Oils*

| Silicone Viscosity, ctsk. | 10% Silicone, 90% IPM | 45% Silicone, 75% IPM | 96% Silicone, 10% IPM |
|---|---|---|---|
| 40 | Soluble | Soluble | Soluble. |
| 100 | do | do | Do. |
| 300 | do | do | Do. |
| 500 | do | do | Do. |
| 1000 | do | do | Do. |
| 5000 | do | do | Do. |
| 10,000 | do | do | Do. |
| 30,000 | do | do | Do. |
| 60,000 | do | do | Do. |
| 100,000 | do | do | Do. |

The mixture shown in Table 1 were all prepared at room temperature (65–85° F.). When chilled to 45° F. solutions of the high viscosity silicone in isopropyl myristate separated into two distinct layers, but formed clear homogeneous solutions when they reached room temperature. The results shown in Table 1 were repeated with Dow Corning 200 Silicon Fluids (dimethylpolysiloxane). Comparable results will also be obtained using other $C_1$–$C_3$ alkyl $C_8$–$C_{14}$ alkanoates, such as ethyl caprylate, ethyl pelargonate, isopropyl caprate, methyl undecylate, methyl laurate, propyl laurate, methyl myristate, etc. The isopropyl caprate, laurate and myristate esters appear to possess extremely good solvent properties, and isopropyl laurate and myristate are particularly suitable for use in formulations of cosmetic and dermatological preparations. The instant alkyl alkanoate esters are also of use in affording a mutual solvent for the silicones and the fats, oils and waxes frequently used in such cosmetic and dermatological preparations, and these alkyl alkanoates are non-toxic, non-irritating and non-sensitizing. Particularly, the isopropyl myristate and laurate are free from odors.

Also, various other organo-silicon polymers may be used in the practice of the instant invention. The polysiloxane oils are used most predominantly in cosmetic and dermatological preparations, but in certain cases the polysiloxane resin formers are also used and (prior to their heat treatment to impart resinous properties thereto) such polysiloxane resin formers may also be used. As will be appreciated, the molecular structure of the resin formers is substantially the same as that of the oils, with the exception that a relatively small amount of hydrolyzable groups are present in the molecule.

In general, the molecular structure (at least for purposes of solvent analysis) of the polysiloxane oils and the polysiloxane resin formers is that indicated in the structural formula hereinbefore and the difference is that a slight number of the R groups in the resin former are hydrolyzable to permit cross linking. Prior to such cross linking, however, the number and character of such hydrolyzable groups is such that the overall solvent properties of the polysiloxanes are quite similar. Depending upon the molecular weight, as defined by the number of building units defined as $n$ in the formula, the polysiloxanes may range from a fluid of low viscosity, representing a chain with a few Si—O—Si linkages, to a viscous substantially solid material having wax-like properties, representing a chain with thousands of such building units therein. Each such polysiloxane molecule is terminated with what is referred to as a blocking unit which corresponds to one of the R groups on the terminal silicon atom in the formula and, when properly blocked, the molecule becomes stable to heat and moisture (if no hydrolyzable groups have been incorporated in the molecule at other locations). The various polysiloxane fluids or lubricants are defined primarily on the basis of their viscosities measured at a temperature of about 25° C. Such viscosities may range from 1 centistoke to as much as 100,000 centistokes. The chain length alone does not control the viscosity, since different R groups attached to the silicon atoms in the molecule may also alter the viscosities. For example, the viscosity range for dimethylpolysiloxane and diphenylpolysiloxane having the same chain length will be different. Commercial polysiloxanes which may be used in the practice of the invention to particular advantage include dimethylpolysiloxane (DC 200 fluid and GE SF–96 fluid), diethylpolysiloxane (DC 400 fluid), diphenylpolysiloxane (DC 500 fluid), dimethylpolysiloxane-diphenylpolysiloxane (DC 555 fluid), lauryl methyl polysiloxane (DC 1300 fluid, and dilaurylpolysiloxane (DC 1500 fluid). In the usual cosmetic and dermatological preparation, silicone oils having viscosities within the range of 100 to 1000 centistokes are usually used, and such oils are readily dissolved by the instant alkyl alkanoates. Further examples of fluids which may be used in the practice of the instant invention are set forth in U.S. Patents Nos. 2,384,384 and 2,377,689.

Polysiloxane resin forming material suitable for use in the practice of the instant invention are materials which ordinarily make use of heat to advance the polymer from an intermediate chain-like stage to a stage of advanced polymeric growth usually involving cross links between the chains. In cosmetic and dermatological preparations, one of the more common uses for resin forming materials is in the treatment of hair, and the resin formers thus used may be described as resin forming materials which can be further polymerized at temperatures below about 500° F. and preferably at temperatures in the range of 300 to 450 °F. Materials of this type, and the preparation thereof, are described in U.S. Patents Nos. 2,258,221, 2,371,068, 2,389,477, 2,392,716, 2,371,050, 2,413,389, 2,375,998 and 2,398,672. A typical example of a resin forming polysiloxane which is completely miscible with the instant alkyl alkanoates, such as isopropyl myristate, is a phenyl ethyl polysiloxane containing small amounts of phenyl and ethyl polyisloxanes to effect curing at 350° F.

Specific examples of compositions embodying the instant invention include the following:

EXAMPLE 1

| | Parts |
|---|---|
| General Electric SF–96 Silicone-dimethylpolysiloxane (500 ctsk.) | 1.0 |
| Isopropyl myristate | 9.0 |
| Mineral oil (80/90 Saybolt viscosity) | 3.0 |

The silicone was first dissolved in isopropyl myristate and then the mineral oil stirred in. A clear solution resulted.

EXAMPLE 2

| | Parts |
|---|---|
| General Electric Silicone SF–96 dimethylpolysiloxane (500 ctsk.) | 1.0 |
| Isopropyl myristate | 9.0 |
| Petrolatum | 1.0 |

The petrolatum was stirred into a warm solution of the silicone oil in isopropyl myristate, and then cooled. A clear, stable solution resulted.

EXAMPLE 3

| | Parts |
|---|---|
| Dow Corning 200 Fluid-dimethylpolysiloxane (350 ctsk.) | 1.0 |
| Isopropy myristate | 9.0 |
| Mineral oil (80/90 Saybolt viscosity) | 5.0 |

Formed a clear liquid.

EXAMPLE 4

| | Parts |
|---|---|
| General Electric Viscasil - dimethylpolysiloxane (100,00 ctsk.) | 1.0 |
| Isopropyl myristate | 22.0 |
| Mineral oil (65/75 Saybolt viscosity) | 2.0 |

A clear stable solution resulted.

EXAMPLE 5

| | Parts |
|---|---|
| (A) Dow Corning 200 Fluid-dimethylpolysiloxane (350 ctsk.) | 1.0 |
| Isopropyl myristate | 9.0 |
| (B) Lanolin | 1.0 |
| Isopropyl myristate | 9.0 |

Prepared solutions A and B separately, then mixed the two solutions together. A clear stable solution resulted.

EXAMPLE 6

| | Parts |
|---|---|
| Dimethylpolysiloxane Oil, 500 ctsk. (GE SF-96) | 10.0 |
| Isopropyl myristate | 85.0 |
| Undecylenic acid | 5.0 |

A clear, stable liquid resulted.

EXAMPLE 7

| | Parts |
|---|---|
| Isopropyl myristate | 88.0 |
| Sun screening compound | 1.5 |
| General Electric Viscasil - dimethylpolysiloxane (100,00 ctsk. silicone) | 3.0 |
| Mineral oil (65/75 Saybolt viscosity) | 7.5 |

This formed a clear stable liquid useful as a water resistant sun tan oil.

EXAMPLE 8

| | Parts |
|---|---|
| Dimethylpolysiloxane oil, 30,00 ctsk. (GE SF-96) | 10.0 |
| Isopropyl myristate | 90.0 |

Formed a clear, stable solution.

EXAMPLE 9

| | Parts |
|---|---|
| Dimethylpolysiloxane oil, 300 ctsk. | 1.0 |
| Isopropyl myristate | 18.0 |
| Stearyl alcohol | 1.0 |

A clear, stable solution resulted.

EXAMPLE 10

| | Parts |
|---|---|
| Methylphenylpolysiloxane (30 ctsk.) | 2 |
| Isopropyl laurate | 10 |
| Mineral oil (65/75 Saybolt viscosity) | 2 |

EXAMPLE 11

| | Parts |
|---|---|
| Diphenylpolysiloxane (500 ctsk.) | 2 |
| Isopropyl myristate | 10 |
| Petrolatum | 1 |

EXAMPLE 12

| | Parts |
|---|---|
| Dimethylpolysiloxane (300 ctsk.) | 2 |
| Ethyl caprylate or ethyl caprate | 10 |
| Mineral oil (65/75 Saybolt viscosity) | 1 |

EXAMPLE 13

| | Parts |
|---|---|
| Dimethylpolysiloxane (300 ctsk.) | 2 |
| Methyl laurate or methyl myristate | 10 |
| Lanolin | 1 |

EXAMPLE 14

| | Parts |
|---|---|
| Dimethylpolysiloxane oil (300 ctsk.) | 2 |
| Dimethylpolysiloxane resin-former (having methylpolysiloxane additive) | 2 |
| Isopropyl myristate | 10 |

EXAMPLE 15

| | Parts |
|---|---|
| Isopropyl myristate | 9.0 |
| Dimethylpolysiloxane oil, 100 ctsk. (GE SF-96) | 0.5 |
| Sesame oil | 0.5 |

Formed a clear, stable liquid.

Apparently the dimethylpolysiloxane oils and resin forming materials are the most difficult to dissolve and the instant invention affords the advantage that the alkyl alkanoate esters here used are particularly suitable for dissolving dimethylpolysiloxanes having viscosities in the range of about 1 to about 100,000 centistokes.

In general, in the preparation of cosmetic and dermatological formulations embodying the instant invention, the alkyl alkanoate ester component (which will be used in forming a single phase or solution of the polysiloxane plus an additional cosmetic ingredient) should comprise at least about 60 weight percent of the single phase, and preferably about 80%. In order to have an appreciable amount of the polysiloxane, at least about 1% should be used and preferably the maximum is not greater than about 10 to 20%. In order to have an appreciable amount of any of the other individual cosmetic ingredients at least about 1% should be used and preferably not more than about 10 to 20% is used in the case of such cosmetic ingredients as petrolatum, lanolin, $C_8$-$C_{20}$ fatty acids and $C_8$-$C_{20}$ fatty alcohols. In the case of mineral oil, however, it appears that larger amounts up to about 50% may be used.

Another aspect of the instant invention resides in the use of the various $C_8$-$C_{20}$ fatty acids, such as undecylenic and stearic acids, the $C_8$-$C_{20}$ fatty alcohols such as lauryl and stearyl alcohols and/or certain natural oils which are glycerides of the $C_8$-$C_{20}$ fatty acids, as for example, sesame oil, all of which ingredients are used as soothing agents and the like in cosmetic and dermatological preparations. Such ingredients may be used in amounts ranging from about 1% to about 10 to 20% as above indicated.

Still another aspect of the instant invention resides in the preparation of unique dispersions of the instant polysiloxanes in water. These unusual compositions may be formed initially using small amounts of water so as to obtain a clear viscous gel wherein the particle sizes of the dispersed (polysiloxane) phase may be so small that clear, bright colloidal dispersions result. Such gels are dilutable infinitely in water. In the preparation of these unusual dispersions, the alkyl alkanoate and the polysiloxane still comprise a single phase system, although this is the dispersed phase. It has been found that using the usual dispersing or surface active agents, the instant dispersions cannot be formed unless the alkyl alkanoate solution of the polysiloxane is used. In this solution, the proportions of alkyl alkanoate to polysiloxane may range from as little as about 5% of one of these ingredients to 95% of the other, but preferably the weight ratio is in the range from about 1 to 10 parts of polysiloxane to 10 parts of the alkyl alkanoate. The wetting agent used may be used in amounts ranging from a minimum effective amount of about 10% of the alkyl alkanoate-polysiloxane phase to about 200% thereof. In forming the initial gel, the non-aqueous ingredients are admixed first and the water is added subsequently. The initial addition of water is accomplished slowly with stirring and the gel is then created with a small amount of heat, merely by the addition of amounts of water within the range of about 10 to 30% of the alkyl alkanoate-polysiloxane phase. This creates a stable gel which may be packaged as such and subsequently dispersed in larger amounts of water to obtain dispersions wherein the organo-silicon polymer content may range from as little as 0.1% to 30% or more. The lower percentages ordinarily being used ultimately by the user, for example, in imparting a water-resistant coating to masonry, or similar industrial uses of this character. Typical examples of the formation of such gels are indicated below:

EXAMPLE 16

| | Parts |
|---|---|
| Dimethylpolysiloxane oil, 30,000 ctsk. (GE) | 1.0 |
| Isopropyl myristate | 9.0 |
| Polyoxyethylene sorbitan monolaurate (Tween 20) | 10.0 |
| Water | 5.0 |

The silicone is dissolved in the isopropyl myristate at room temp. and then the Tween 20 stirred in. The water is then added slowly while stirring. An amber colored, clear, viscous gel resulted containing 4% of silicone oil. This gel disperses in water to form a white emulsion.

EXAMPLE 17

| | Parts |
|---|---|
| Dimethylpolysiloxane oil, 60,000 ctsk. (GE) | 5.0 |
| Isopropyl myristate | 5.0 |
| Polyoxyethylene sorbitan monolaurate (Tween 20) | 5.0 |
| Water | 3.0 |

Prepared in the same manner as Example 16. A clear, viscous gel resulted containing 27.8% of silicone oil. The gel is dispersible in water to form a white oil in water emulsion.

EXAMPLE 18

| | Parts |
|---|---|
| Dimethylpolysiloxane oil, 5000 ctsk. (GE) | 2.0 |
| Isopropyl myristate | 18.0 |
| Polyoxyethylene sorbitan monolaurate | 20.0 |
| Water | 10.0 |

Upon addition of the water the mixture becomes warm and a clear viscous liquid results containing 4% silicone oil.

EXAMPLE 19

| | Parts |
|---|---|
| Dimethylpolysiloxane oil, 12,500 ctsk. (Dow Corning 200 Fluid) | 6.0 |
| Isopropyl myristate | 14.0 |
| Polyoxyethylene sorbitan monolaurate | 20.0 |
| Water | 12.0 |

Generated heat upon addition of the water. A clear viscous liquid resulted with a silicone content of 11.54%. This liquid disperses in water to form a white oil in water emulsion.

It will be appreciated that any of the ordinary wetting agents may be used in the practice of the instant invention, and it is desirable to select a compound that is stable, which has little if any color, and which is generally compatible. For example, use may be made of aryl alkyl polyether alcohols such as those marketed under the trade name "X-100" (Rohm and Haas) and under the trade name "Tween" (marketed by Atlas Powder Company) which are polyoxyethylene derivatives of sorbitan monolaurate, monopalmitate, or monostearate. These polyoxyethylene derivatives (usually containing 2 to 10 polyethoxide groups) of polyalcohol (2 to 6 hydroxy) mono $C_{12}$-$C_{18}$ alkanoates are preferred wetting agents for use herein. Other commercially available materials which may be used in the practice of the invention include polyglycerol esters, dioctyl ester of sodium sulfosuccinate, alkyl naphthalene sulfonate, sorbitan sulfooleate, fatty alcohol sulphates, aromatic polyglycol ethers, polyoxyethylene ethers, sodium di(2-ethyl-hexyl) phosphate, alkyl aryl sulfonates, and the like.

In the alkyl alkanoate-polysiloxane system, whether it is to be used in dispersions or in other generally incompatible compositions, is unique in and of itself since it possesses compatibility superior to that of the polysiloxane even when amounts of 1% or more of the alkyl alkanoate are used and it possesses advantageous hydrophobic properties characteristic of the polysiloxane even when amounts of 1% or more of the polysiloxane are used. The alkyl alkanoate-polysiloxane weight ratio in the system may thus range from 1:99 to 99:1, and preferably 1:9 to 9:1.

It will be understood that modifications and variations may be effected without departing from the scope of the novel concepts of the present invention.

I claim as my invention:

1. A composition comprising a $C_1$-$C_3$ alkyl $C_8$-$C_{14}$ alkanoate and an organo-silicon polymer dissolved therein, wherein, when the alkyl radical is $C_1$ the alkanoate radical is $C_{11}$-$C_{14}$, and when the alkyl radical is $C_2$-$C_3$ the alkanoate radical is $C_8$-$C_{14}$.

2. A composition comprising isopropyl $C_8$-$C_{14}$ alkanoate and an organo-silicon polymer dissolved therein.

3. A composition comprising a $C_1$-$C_3$ alkyl myristate and an organo-silicon polymer dissolved therein.

4. A composition comprising isopropyl myristate and an organo-silicon polymer dissolved therein.

5. A composition comprising isopropyl myristate and an organo-silicon fluid polymer dissolved therein to form a single phase.

6. A composition comprising isopropyl myristate and a dimethyl polysiloxane having a viscosity in the range of 1–100,000 centistokes at 25° C., forming a single phase.

7. A composition comprising 60–98% of a $C_1$-$C_3$ alkyl $C_8$-$C_{14}$ alkanoate, 1–20% of an organo-silicon polymer, and 1–30% mineral oil, wherein, when the alkyl radical is $C_1$ the alkanoate radical is $C_{11}$-$C_{14}$, and when the alkyl radical is $C_2$-$C_3$ the alkanoate radical is $C_8$-$C_{14}$.

8. A composition comprising 60–98% of a $C_1$$C_3$ alkyl $C_8$-$C_{14}$ alkanoate, 1–20% of an organo-silicon polymer, and 1–20% petrolatum, wherein, when the alkyl radical is $C_1$ the alkanoate radical is $C_{11}$-$C_{14}$, and when the alkyl radical is $C_2$-$C_3$ the alkanoate radical is $C_8$-$C_{14}$.

9. A composition comprising 60–98% of a $C_1$-$C_3$ alkyl $C_8$-$C_{14}$ alkanoate, 1–20% of an organo-silicon polymer, and 1–20% lanolin, wherein, when the alkyl radical is $C_1$ the alkanoate radical is $C_{11}$-$C_{14}$, and when the alkyl radical is $C_2$-$C_3$ the alkanoate radical is $C_8$-$C_{14}$.

10. A composition comprising 60–98% of a $C_1$-$C_3$ alkyl $C_8$-$C_{14}$ alkanoate, 1–20% of an organo-silicon polymer, and 1–20% $C_8$-$C_{20}$ fatty acid, wherein, when the alkyl radical is $C_1$ the alkanoate radical is $C_{11}$-$C_{14}$, and when the alkyl radical is $C_2$-$C_3$ the alkanoate radical is $C_8$-$C_{14}$.

11. A composition comprising 60–98% of a $C_1$-$C_3$ alkyl $C_8$-$C_{14}$ alkanoate, 1–20% of an organo-silicon polymer, and 1–20% $C_8$-$C_{20}$ fatty alcohol, wherein, when the alkyl radical is $C_1$ the alkanoate radical is $C_{11}$-$C_{14}$, and when the alkyl radical is $C_2$-$C_3$ the alkanoate radical is $C_8$-$C_{14}$.

12. A cosmetic composition consisting essentially of isopropyl myristate and an organopolysiloxane, forming a single phase.

13. A composition comprising an organo-silicon polymer dissolved in an isopropyl ester of a fatty acid containing 12 to 14 carbon atoms.

References Cited by the Examiner

UNITED STATES PATENTS

| 2,293,551 | 8/42 | Kunz | 167—65 |
| 2,467,178 | 4/49 | Zimmer et al. | 252—49.6 |
| 2,626,870 | 1/53 | Cooke et al. | 260—29.1 |
| 2,628,213 | 2/53 | Rust | 260—31.2 |

FOREIGN PATENTS

| 686,429 | 1/53 | Great Britain. |

OTHER REFERENCES

Tajkowski: Proceedings of the Scientific Section of the Toilet Goods Asso., No. 20, December 1953, pp. 1–7.

Pears: Perfumery and Essential Oil Record, 44:3, March 1953, pp. 84–90, 101.

LEWIS GOTTS, *Primary Examiner.*

W. G. BENGEL, D. ARNOLD, M. O. WOLK, W. B. KNIGHT, *Examiners.*